United States Patent
Lu et al.

(10) Patent No.: US 10,900,789 B2
(45) Date of Patent: Jan. 26, 2021

(54) POSITIONING METHOD AND MOBILE DEVICE

(71) Applicant: Huawei Technologies Co., Ltd., Shenzhen (CN)

(72) Inventors: Chenxi Lu, Shenzhen (CN); Yu Wang, Beijing (CN); Guoliang Li, Shenzhen (CN); Xiaohan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 16/303,324

(22) PCT Filed: May 20, 2016

(86) PCT No.: PCT/CN2016/082836
§ 371 (c)(1),
(2) Date: Nov. 20, 2018

(87) PCT Pub. No.: WO2017/197644
PCT Pub. Date: Nov. 23, 2017

(65) Prior Publication Data
US 2019/0212150 A1     Jul. 11, 2019

(51) Int. Cl.
*G01C 21/20* (2006.01)
*H04M 1/725* (2006.01)

(52) U.S. Cl.
CPC ......... *G01C 21/20* (2013.01); *H04M 1/72569* (2013.01); *H04M 1/72572* (2013.01); *H04M 2250/12* (2013.01)

(58) Field of Classification Search
CPC .............. G01C 21/20; H04M 2250/12; H04M 1/72572; H04M 1/72569
(Continued)

(56) References Cited

U.S. PATENT DOCUMENTS

| 2011/0215903 A1* | 9/2011 | Yang ................... G01S 19/34 340/8.1 |
| 2016/0044462 A1 | 2/2016 | Li et al. |

FOREIGN PATENT DOCUMENTS

| CN | 102799897 A | 11/2012 |
| CN | 102809378 A | 12/2012 |

(Continued)

OTHER PUBLICATIONS

Machine Translation and Abstract of Chinese Publication No. CN103471586, Dec. 25, 2013, 12 pages.
(Continued)

*Primary Examiner* — Brian P Sweeney
(74) *Attorney, Agent, or Firm* — Conley Rose, P.C.

(57) ABSTRACT

A positioning method and a mobile device, where the method is applied to the mobile device and includes periodically detecting a status of the mobile device, where the status of the mobile device includes a driving state and a walking state, positioning the mobile device using a first positioning algorithm when detecting that a quantity of times that the driving state consecutively occurs reaches M, where the M is an integer greater than one, and positioning the mobile device using a second positioning algorithm when detecting that a quantity of times that the walking state consecutively occurs reaches N, where the N is an integer greater than one. Hence, the status of the mobile device can be more accurately determined by implementing this technical solution to position the mobile device using a positioning algorithm matching an actual status of the mobile device, thereby improving accuracy of a positioning result.

20 Claims, 3 Drawing Sheets

(58) Field of Classification Search
USPC .......................................................... 701/494
See application file for complete search history.

(56) References Cited

FOREIGN PATENT DOCUMENTS

| | | | |
|---|---|---|---|
| CN | 103471586 | A | 12/2013 |
| CN | 103558617 | A | 2/2014 |
| CN | 103701991 | A | 4/2014 |
| CN | 104076379 | A | 10/2014 |
| CN | 104125021 | A | 10/2014 |
| CN | 104181500 | A | 12/2014 |
| CN | 104540220 | A | 4/2015 |
| CN | 105338496 | A | 2/2016 |
| CN | 105539450 | A | 5/2016 |
| WO | 2011107652 | A1 | 9/2011 |
| WO | 2016048538 | A1 | 3/2016 |

OTHER PUBLICATIONS

Machine Translation and Abstract of Chinese Publication No. CN103701991, Apr. 2, 2014, 22 pages.
Machine Translation and Abstract of Chinese Publication No. CN104181500, Dec. 3, 2014, 14 pages.
Machine Translation and Abstract of Chinese Publication No. CN104540220, Apr. 22, 2015, 13 pages.
Foreign Communication From a Counterpart Application, European Application No. 16902028.6, Extended European Search Report dated Apr. 9, 2019, 16 pages.
Machine Translation and Abstract of Chinese Publication No. CN103558617, Feb. 5, 2014, 22 pages.
Machine Translation and Abstract of Chinese Publication No. CN105338496, Feb. 17, 2016, 11 pages.
Machine Translation and Abstract of Chinese Publication No. CN105539450, May 4, 2016, 26 pages.
Ren, B., "Do you want to move the user habit?," Gao De Map Vehicle Version Release, From the internet: https://www.autohome.com.cn/use/201601/883830.html. Jan. 13, 2016, 7 pages.
English Translation of Ren, B., "Do you want to move the user habit?," Gao De Map Vehicle Version Release, From the internet: https://www.autohome.com.cn/use/201601/883830.html. Jan. 13, 2016, 7 pages.
Foreign Communication From a Counterpart Application, PCT Application No. PCT/CN2016/082836, English Translation of International Search Report dated Feb. 6, 2017, 2 pages.
Foreign Communication From a Counterpart Application, PCT Application No. PCT/CN2016/082836, English Translation of Written Opinion dated Feb. 6, 2017, 4 pages.
Machine Translation and Abstract of Chinese Publication No. CN102799897, Nov. 28, 2012, 12 pages.
Machine Translation and Abstract of Chinese Publication No. CN102809378, Dec. 5, 2012, 9 pages.
Foreign Communication From a Counterpart Application, Chinese Application No. 201680024935.0, Chinese Office Action dated Jul. 22, 2019, 7 pages.
Machine Translation and Abstract of Chinese Publication No. CN104076379, Oct. 1, 2014, 13 pages.

* cited by examiner

POSITIONING METHOD AND MOBILE DEVICE

CROSS-REFERENCE TO RELATED APPLICATIONS

This application is a U.S. National Stage of International Patent Application No. PCT/CN2016/082836 filed on May 20, 2016, which is hereby incorporated by reference in its entirety.

TECHNICAL FIELD

The present invention relates to the field of positioning technologies, and in particular, to a positioning method and a mobile device.

BACKGROUND

Currently, with the development of mobile devices (devices such as a mobile phone and a tablet computer), an increasing quantity of users use a positioning function of the mobile devices. Frequently-used positioning algorithms of the mobile devices include a wireless positioning algorithm, a dead reckoning algorithm, and the like. The wireless positioning algorithm includes a Global Positioning System (Global Positioning System, GPS) positioning algorithm, a Wi-Fi positioning algorithm, a Bluetooth positioning algorithm, and the like. The dead reckoning algorithm is an algorithm for calculating a location of a mobile device at a next moment by measuring a moving distance and a moving direction of the mobile device provided that a location of the mobile device at the current moment is known. The dead reckoning algorithm includes a pedestrian dead reckoning algorithm, a vehicle dead reckoning algorithm, and the like.

In an actual application, when a mobile device is in different statuses, the mobile device needs to position the mobile device by using a positioning algorithm matching a current status of the mobile device. For example, if the mobile device is positioned by using the dead reckoning algorithm, when the mobile device is in a walking state (that is, when a user carrying the mobile device is walking), the mobile device can be accurately positioned only by using the pedestrian dead reckoning algorithm, and when the mobile device is in a driving state (that is, when the user carrying the mobile device is on a vehicle), the mobile device can be accurately positioned only by using the vehicle dead reckoning algorithm.

In the prior art, a mobile terminal positions a user by using the pedestrian dead reckoning algorithm (or the vehicle dead reckoning algorithm) as long as the mobile terminal detects that the user is in the walking state (or the driving state). However, it is found from practice that a dead reckoning algorithm used in this manner may not match an actual status of a mobile device, and consequently, a positioning result is not accurate, and even worse, positioning cannot be normally performed.

SUMMARY

This application discloses a positioning method and a mobile device, so as to improve accuracy of a positioning result of the mobile device.

According to a first aspect, a positioning method is provided. The method is applied to a mobile device, and includes: periodically detecting a status of the mobile device, where the status of the mobile device includes a driving state and a walking state; positioning the mobile device by using a first positioning algorithm matching the driving state, when detecting that a quantity of times that the driving state consecutively occurs reaches M, where M is an integer greater than 1, and positioning the mobile device by using a second positioning algorithm matching the walking state, when detecting that a quantity of times that the walking state consecutively occurs reaches N, where N is an integer greater than 1. The first positioning algorithm may be a vehicle dead reckoning algorithm, or a combination of a wireless positioning algorithm and a vehicle dead reckoning algorithm. The second positioning algorithm may be a pedestrian dead reckoning algorithm, or a combination of the wireless positioning algorithm and a pedestrian dead reckoning algorithm. It can be learned that in this way, an actual status of the mobile device can be more accurately determined, so as to position the mobile device by using a positioning algorithm matching the actual status of the mobile device, thereby improving accuracy of a positioning result.

In a possible design, only when a currently-used positioning algorithm is a non-first positioning algorithm, the mobile device may detect whether a quantity of times that the driving state consecutively occurs reaches M; and only when the currently-used positioning algorithm is a non-second positioning algorithm, the mobile device may detect whether a quantity of times that the walking state consecutively occurs reaches N. In this way, it is unnecessary to constantly detect whether the quantity of times that the driving state of the mobile device consecutively occurs reaches M or whether the quantity of times that the walking state of the mobile device consecutively occurs reaches N, so as to save a CPU resource.

In a possible design, when the currently-used positioning algorithm is a non-first positioning algorithm, the mobile device may directly detect whether the quantity of times that the driving state consecutively occurs reaches M; and when the currently-used positioning algorithm is a non-second positioning algorithm, the mobile device may directly detect whether the quantity of times that the walking state consecutively occurs reaches N. For example, when a third positioning algorithm is currently used, the mobile device may directly detect whether the quantity of times that the driving state consecutively occurs reaches M and whether the quantity of times that the walking state consecutively occurs reaches N. The third positioning algorithm may be the wireless positioning algorithm, or another positioning algorithm other than the first positioning algorithm and the second positioning algorithm.

In a possible design, the positioning the mobile device by using a second positioning algorithm when detecting that a quantity of times that the walking state consecutively occurs reaches N may include: positioning the mobile device by using the second positioning algorithm when detecting that a quantity of times that a non-driving state of the mobile device consecutively occurs reaches Y and a quantity of times that the walking state consecutively occurs in the Y times of the non-driving state reaches N, where Y is an integer that is not less than N. That is, in this design, the mobile device does not directly detect whether the quantity of times that the walking state consecutively occurs reaches N. For example, in this design, when the currently-used positioning algorithm is the first positioning algorithm, the mobile device may first detect whether the quantity of times that the non-driving state of the mobile device consecutively occurs reaches Y; when detecting that the quantity of times that the non-driving state of the mobile device consecutively occurs reaches Y, detect whether the quantity of times that the walking state consecutively occurs in the Y times of the non-driving state reaches N; and position the mobile device by using the second positioning algorithm when detecting that the quantity of times that the walking state consecutively occurs in the Y times of the non-driving state reaches N. If the quantity of times that the walking state consecutively occurs in the Y times of the non-driving state reaches N, it proves that there is a high probability that a current actual status of the mobile device is the walking state. Therefore, in this case, the mobile terminal is positioned by using the second positioning algorithm, so as to improve accuracy of a positioning result.

In a possible design, when the mobile device detects that the quantity of times that a non-driving state of the mobile device consecutively occurs reaches Y and the quantity of times that the walking state consecutively occurs in the Y times of the non-driving state does not reach N, the mobile device is positioned by using a third positioning algorithm, where Y is an integer that is not less than N. The third positioning algorithm may be the wireless positioning algorithm, or another positioning algorithm other than the first positioning algorithm and the second positioning algorithm. In this design, if the quantity of times that the walking state consecutively occurs in the Y times of the non-driving state does not reach N, it proves that there is a high probability that a current actual status of the mobile device is neither the walking state nor the driving state. For example, in this case, the actual status of the mobile device may be a shaking state, and positioning performed by using the first positioning algorithm or the second positioning algorithm in the shaking state has relatively low accuracy. Therefore, in this case, the mobile terminal is positioned by using another positioning algorithm other than the first positioning algorithm and the second positioning algorithm, so as to improve accuracy of a positioning result.

In a possible design, the positioning the mobile device by using a first positioning algorithm when detecting that a quantity of times that the driving state consecutively occurs reaches M may include: positioning the mobile device by using the first positioning algorithm when detecting that the quantity of times that the non-walking state of the mobile device consecutively occurs reaches X and a quantity of times that the driving state consecutively occurs in the X times of the non-walking state reaches M, where X is an integer that is not less than M. That is, in this design, the mobile device does not directly detect whether the quantity of times that the driving state consecutively occurs reaches M. For example, in this design, when the currently-used positioning algorithm is the second positioning algorithm, the mobile device may first detect whether the quantity of times that a non-walking state consecutively occurs reaches X; when detecting that the quantity of times that the non-walking state consecutively occurs reaches X, further detect whether the quantity of times that the driving state consecutively occurs in the X times of the non-walking state reaches M; and when the quantity of times that the driving state consecutively occurs in the X times of the non-walking state reaches M, position the mobile device by using the first positioning algorithm. If the quantity of times that the driving state consecutively occurs in the X times of the non-walking state reaches M, it proves that there is a high probability that the current actual status of the mobile device is the driving state. Therefore, in this case, a mobile terminal is positioned by using the first positioning algorithm, so as to improve accuracy of a positioning result.

In a possible design, when the mobile device detects that the quantity of times that the non-walking state of the mobile device consecutively occurs reaches X and the quantity of times that the driving state consecutively occurs in the X times of the non-walking state does not reach M, the mobile device is positioned by using the third positioning algorithm, where X is an integer that is not less than M. The third positioning algorithm may be the wireless positioning algorithm, or another positioning algorithm other than the first positioning algorithm and the second positioning algorithm. If the quantity of times that the driving state consecutively occurs in the X times of the non-walking state does not reach M, it proves that there is a high probability that the current actual status of the mobile device is neither the walking state nor the driving state. For example, in this case, the actual status of the mobile device may be a shaking state, and positioning performed by using the first positioning algorithm or the second positioning algorithm in the shaking state has relatively low accuracy. It can be learned that by implementing this design, when it is detected that the quantity of times that the driving state consecutively occurs in the X times of the non-walking state does not reach M, the mobile terminal is positioned by using another positioning algorithm other than the first positioning algorithm or the second positioning algorithm, so as to improve accuracy of a positioning result.

In a possible design, the status of the mobile device further includes a static state. At least one driving state in the M times that the driving state consecutively occurs is obtained by replacing the static state, or at least one walking state in the N times that the walking state consecutively occurs is obtained by replacing the static state. For example, when it is detected that the current status of the mobile device is the static state, if a latest status detected before the static state is the driving state in the driving state and the walking state, the static state may be replaced by the driving state.

In an optional implementation, each state in the M times that the driving state consecutively occurs is an actually detected state, that is, each state is not obtained by replacing another state.

In an optional implementation, each state in the N times that the walking state consecutively occurs is a state actually detected by the mobile device, that is, each state is not obtained by replacing another state.

According to a second aspect, a positioning method is provided. The method is applied to a mobile device, and includes: periodically detecting a status of the mobile device, where the status of the mobile device includes a driving state and a walking state; positioning the mobile device by using a first positioning algorithm when detecting that a quantity of times that the driving state consecutively occurs reaches M, where M is an integer greater than 1; and positioning the mobile device by using a second positioning algorithm when detecting that a quantity of times that a non-driving state of the mobile device consecutively occurs reaches Y and a quantity of times that the walking state occurs in the Y times of the non-driving state reaches N, where Y is an integer that is not less than N and N is an integer greater than 1. The first positioning algorithm may be a vehicle dead reckoning algorithm, or a combination of a wireless positioning algorithm and a vehicle dead reckoning algorithm. The second positioning algorithm may be a pedestrian dead reckoning algorithm, or a combination of the wireless positioning algorithm and a pedestrian dead reckoning algorithm. The mobile device may detect, by using a non-first positioning algorithm, whether the quantity of times that the driving state consecutively occurs reaches M. The mobile device may first detect, by using the first positioning algorithm, whether the quantity of times that the non-driving state of the mobile device consecutively occurs reaches Y, and if the quantity of times that the non-driving state of the mobile device consecutively occurs reaches Y, detect whether the quantity of times that the walking state occurs in the Y times of the non-driving state reaches N. It can be learned that in this way, the status of the mobile device can be more accurately determined, so as to position the mobile device by using a positioning algorithm matching the actual status of the mobile device, thereby improving accuracy of a positioning result.

Optionally, in this method, positioning is performed by using the second positioning algorithm only when the quantity of time that the walking state consecutively occurs in the Y times of the non-driving state reaches N. Optionally, the mobile device may set a first counter to count the non-driving state, and set a second counter to count the walking state. When it is detected that the status of the mobile device is the non-driving state, a value of the first counter is increased by 1; and when the driving state is detected, the value of the first counter returns to zero. When it is detected that the status of the mobile device is the walking state, a value of the second counter is increased by 1; and when a non-walking state is detected, the value of the second counter returns to zero. Whether the value of the second counter reaches N is detected if the value of the first counter reaches Y, and if the value of the second counter reaches N, positioning is performed by using the second positioning algorithm.

Optionally, in this method, positioning is performed by using the second positioning algorithm as long as the quantity of times that the walking state occurs in the Y times of the non-driving state reaches N, that is, the walking state does not need to consecutively occur in the N times. Optionally, the mobile device may set a first counter to count the non-driving state, and set a second counter to count the walking state. When it is detected that the status of the mobile device is the non-driving state, a value of the first counter is increased by 1; and when the driving state is detected, the value of the first counter returns to zero. When it is detected that the status of the mobile device is the walking state, a value of the second counter is increased by 1; and when a non-walking state is detected, the value of the second counter returns to zero if the non-walking state is the driving state, or the value of the second counter does not return to zero if the non-walking state is not the driving state. When the mobile device detects that the value of the first counter reaches Y, the mobile device detects whether the value of the second counter reaches N, and if the value of the second counter reaches N, the mobile device is positioned by using the second positioning algorithm, and the value of the second counter returns to zero.

In a possible design, when the mobile device detects that the quantity of times that the non-driving state of the mobile device consecutively occurs reaches Y and the quantity of times that the walking state occurs in the Y times of the non-driving state does not reach N, the mobile device is positioned by using a third positioning algorithm. The third positioning algorithm may be the wireless positioning algorithm, or another positioning algorithm other than the first positioning algorithm and the second positioning algorithm. In this design, if the quantity of times that the walking state occurs in the Y times of the non-driving state does not reach N, it proves that there is a high probability that the current actual status of the mobile device is neither the walking state nor the driving state. Therefore, in this case, the mobile terminal is positioned by using another positioning algorithm other than the first positioning algorithm and the second positioning algorithm, so as to improve accuracy of a positioning result. Optionally, positioning is performed by using the third positioning algorithm only when the quantity of times that the walking state consecutively occurs in the Y times of the non-driving state does not reach N. Optionally, positioning is performed by using the third positioning algorithm before a total quantity of times that the walking state occurs in the Y times of the non-driving state reaches N, that is, the walking state does not need to consecutively occur in the N times.

In a possible design, the status of the mobile device further includes a static state. At least one driving state in the M times that the driving state consecutively occurs is obtained by replacing the static state, or at least one walking state in the N times that the walking state consecutively occurs is obtained by replacing the static state. For example, when it is detected that the current status of the mobile device is the static state, if a latest status detected before the static state is the driving state in the driving state and the walking state, the static state may be replaced by the driving state.

According to a third aspect, a positioning method is provided. The method is applied to a mobile device, and includes: periodically detecting a status of the mobile device, where the status of the mobile device includes a driving state and a walking state; positioning the mobile device by using a second positioning algorithm when detecting that a quantity of times that the walking state consecutively occurs reaches N, where N is an integer greater than 1; and positioning the mobile device by using a first positioning algorithm when detecting that a quantity of times that a non-walking state of the mobile device consecutively occurs reaches X and a quantity of times that the driving state occurs in the X times of the non-walking state reaches M, where X is an integer that is not less than M, and M is an integer greater than 1. The first positioning algorithm may be a vehicle dead reckoning algorithm, or a combination of a wireless positioning algorithm and a vehicle dead reckoning algorithm. The second positioning algorithm may be a pedestrian dead reckoning algorithm, or a combination of the wireless positioning algorithm and a pedestrian dead reckoning algorithm. The mobile device may detect, by using a non-second positioning algorithm, whether the quantity of times that the walking state consecutively occurs reaches N. The mobile device may first detect, by using the second positioning algorithm, whether the quantity of times that the non-walking state of the mobile device consecutively occurs reaches X, and if the quantity of times that the non-walking state of the mobile device consecutively occurs reaches X, detect whether the quantity of times that the driving state occurs in the X times of the non-walking state reaches M. It can be learned that in this way, the status of the mobile device can be more accurately determined, so as to position the mobile device by using a positioning algorithm matching the actual status of the mobile device, thereby improving accuracy of a positioning result.

Optionally, positioning is performed by using the first positioning algorithm only when the quantity of times that the driving state consecutively occurs in the X times of the non-walking state reaches M. Optionally, the mobile device may set a first counter to count the non-walking state, and set a second counter to count the driving state. When it is detected that the status of the mobile device is the non-walking state, a value of the first counter is increased by 1;

and when the walking state is detected, the value of the first counter returns to zero. When it is detected that the status of the mobile device is the driving state, a value of the second counter is increased by 1; and when a non-driving state is detected, the value of the second counter returns to zero. Whether the value of the second counter reaches M is detected if the value of the first counter reaches X; and if the value of the second counter reaches M, positioning is performed by using the first positioning algorithm.

Optionally, positioning is performed by using the first positioning algorithm as long as a quantity of times that the driving state occurs in the X times of the non-walking state reaches M, that is, the driving state does not need to consecutively occur in the M times. Optionally, the mobile device may set a first counter to count the non-walking state, and set a second counter to count the driving state. When it is detected that the status of the mobile device is the non-walking state, a value of the first counter is increased by 1; and when the walking state is detected, the value of the first counter returns to zero. When it is detected that the status of the mobile device is the driving state, a value of the second counter is increased by 1; and when a non-driving state is detected, the value of the second counter returns to zero if the non-driving state is the walking state, or the value of the second counter does not return to zero if the non-driving state is not the walking state. When the mobile device detects that the value of the first counter reaches X, the mobile device detects whether the value of the second counter reaches M; and if the value of the second counter reaches M, the mobile device is positioned by using the first positioning algorithm, and the value of the second counter returns to zero.

In a possible design, when the mobile device detects that the quantity of times that the non-walking state of the mobile device consecutively occurs reaches X and the quantity of times that the driving state occurs in the X times of the non-walking state does not reach M, the mobile device is positioned by using a third positioning algorithm. If the quantity of times that the driving state occurs in the X times of the non-walking state does not reach M, it proves that there is a high probability that the current actual status of the mobile device is neither the walking state nor the driving state. In this case, the mobile terminal is positioned by using the third positioning algorithm other than the first positioning algorithm or the second positioning algorithm, so as to improve accuracy of a positioning result. Optionally, positioning is performed by using the third positioning algorithm only when the quantity of times that the driving state consecutively occurs in the X times of the non-walking state does not reach M. Optionally, positioning is performed by using the third positioning algorithm before a total quantity of times that the driving state occurs in the X times of the non-walking state reaches M, that is, the driving state does not need to consecutively occur in the M times.

In a possible design, the status of the mobile device further includes a static state. At least one driving state in the M times that the driving state occurs is obtained by replacing the static state, or at least one walking state in the N times that the walking state consecutively occurs is obtained by replacing the static state. For example, when it is detected that the current status of the mobile device is the static state, if a latest status detected before the static state is the driving state in the driving state and the walking state, the static state may be replaced by the driving state.

According to a fourth aspect, a mobile device is provided, and the mobile device has a function of implementing an action of the mobile device according to the method or the possible design in any one of the foregoing first aspect to the third aspect. The function may be implemented by using hardware, or may be implemented by implementing corresponding software by hardware. The hardware or the software includes one or more units corresponding to the foregoing function. The unit may be software and/or hardware.

According to a fifth aspect, a mobile device is provided, and the mobile device includes: one or more processors, a memory, a bus system, and one or more programs. The processors and the memory are connected by using a bus system. The one or more programs are stored in the memory, and the one or more programs include an instruction. When the mobile device executes the instruction, the mobile device performs the method or the possible design provided in any one of the foregoing first aspect to the third aspect.

According to a sixth aspect, a mobile device is provided, and the mobile device includes: a display, one or more processors, a memory, and one or more programs. The one or more programs are stored in the memory, and are configured to be executed by the one or more processors. The one or more programs include an instruction. The instruction is used to perform the method or the possible design provided in any one of the foregoing first aspect to the third aspect.

According to a seventh aspect, a computer readable storage medium storing one or more programs is provided. The one or more programs include an instruction, and the instruction is used to perform the method or the possible design provided in any one of the foregoing first aspect to the third aspect.

In the foregoing technical solution, the mobile device is positioned by using the first positioning algorithm only when the mobile device detects that the quantity of times that the driving state consecutively occurs reaches M; and the mobile device is positioned by using the second positioning algorithm only when the mobile device detects that the quantity of times that the walking state consecutively occurs reaches N. It can be learned that the status of the mobile device can be more accurately determined by implementing the embodiments of the present invention, so as to position the mobile device by using a positioning algorithm matching an actual status of the mobile device, thereby improving accuracy of a positioning result.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following describes the technical solutions of the embodiments of the present invention with reference to the accompanying drawings.

The embodiments of the present invention provide a positioning method and a mobile device, so as to resolve a problem that accuracy of a positioning result of the mobile device is not high. The method and the mobile device are based on a same inventive concept. Because the method and the mobile device have similar principles for resolving the problem, for implementations of the mobile device and the method, reference may be made to each other, and repetition is not described.

To clearly describe the solution of the embodiments of the present invention, a possible application scenario of the embodiments of the present invention is described below.

A sensor is disposed in the mobile device. The sensor includes at least one of an acceleration sensor, a gyroscope, or a geomagnetic sensor. The mobile device may identify a current status of the mobile device according to data detected by the sensor. The status of the mobile device may include but is not limited to a walking state, a driving state, a static state, and a shaking state. When the mobile device is positioned, the positioning is accurate only when a corresponding positioning algorithm is used according to a current status of the mobile device. For example, when the mobile device is in the walking state, the mobile device may be accurately positioned by using a pedestrian dead reckoning algorithm, or the mobile device may be accurately positioned by using a wireless positioning algorithm and a pedestrian dead reckoning algorithm. When the mobile device is in the driving state, the mobile device may be accurately positioned by using a vehicle dead reckoning algorithm, or the mobile device may be accurately positioned by using the wireless positioning algorithm and a vehicle dead reckoning algorithm. When the mobile device is in the shaking state, the mobile device may be accurately positioned by using the wireless positioning algorithm, or the mobile device may be accurately positioned by using an algorithm other than the pedestrian dead reckoning, the wireless positioning algorithm, and the vehicle dead reckoning algorithm.

In the prior art, the mobile device periodically detects the status of the mobile device. For example, if a positioning algorithm that is currently used by the mobile device is the vehicle dead reckoning algorithm, when the mobile device detects that the current status of the mobile device is the walking state, the vehicle dead reckoning algorithm is immediately switched to the pedestrian dead reckoning algorithm, and the mobile device is positioned by using the pedestrian dead reckoning algorithm. However, the status of the mobile device that is currently detected by the mobile device may not be a current actual status of the mobile device. Consequently, the mobile device uses a positioning algorithm that does not match the current actual status of the mobile device, to position the mobile device, thereby causing inaccuracy of a positioning result.

To improve accuracy of the positioning result, in the positioning method provided in the embodiments of the present invention, the mobile device is positioned by using a first positioning algorithm (for example, the first positioning algorithm may be the vehicle dead reckoning algorithm, or may be a combination of the wireless positioning algorithm and the vehicle dead reckoning algorithm) matching the driving state, only when it is detected that a quantity of times that the driving state of the mobile device consecutively occurs reaches M, where M is an integer greater than 1. The mobile device is positioned by using a second positioning algorithm (for example, the second positioning algorithm may be the vehicle dead reckoning algorithm, or may be a combination of the wireless positioning algorithm and the vehicle dead reckoning algorithm) matching the walking state, only when it is detected that a quantity of times that the walking state of the mobile device consecutively occurs reaches N, where N is an integer greater than 1. If all consecutively detected statuses of the mobile device are a state, the current actual status of the mobile device is highly likely the state. Therefore, when it is detected that the quantity of times that the driving state of the mobile device consecutively occurs reaches M, the current actual status of the mobile device is highly likely the driving state. In this case, the mobile device may be accurately positioned by using the first positioning algorithm matching the driving state. Similarly, when it is detected that the quantity of times that the walking state of the mobile device consecutively occurs reaches N, the current actual status of the mobile device is highly likely the walking state. In this case, the mobile device may be accurately positioned by using the second positioning algorithm matching the walking state.

It can be understood that the application scenario described in the embodiments of the present invention are intended to describe the technical solutions in the embodiments of the present invention more clearly, but is not construed as a limitation on the technical solutions provided in the embodiments of the present invention. A person of ordinary skill in the art may understand that the technical solutions provided in the embodiments of the present invention are also applicable to a similar technical problem in an application scenario.

Based on foregoing common aspects included in the embodiments of the present invention, the following further describes this embodiment of the present invention in detail.

Figure 1:
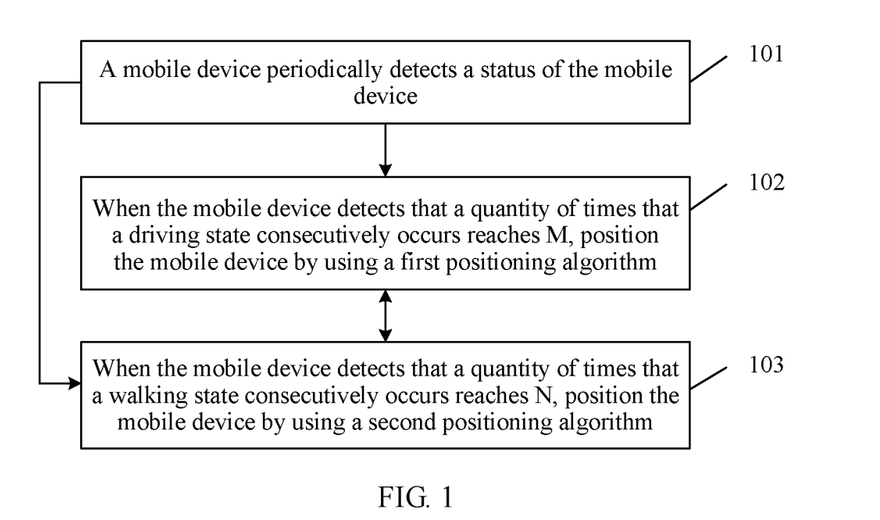
FIG. 1 is a schematic flowchart of a positioning method according to an embodiment of the present invention.

FIG. 1 is a schematic flowchart of a positioning method according to an embodiment of the present invention. As shown in FIG. 1, the positioning method may include 101 to 103.

101. A mobile device periodically detects a status of the mobile device.

In this embodiment of the present invention, the status of the mobile device includes a driving state and a walking state. Optionally, the status of the mobile device may further include a static state, a shaking state, and the like.

102. When the mobile device detects that a quantity of times that a driving state consecutively occurs reaches M, position the mobile device by using a first positioning algorithm.

In this embodiment of the present invention, M is an integer greater than 1. Optionally, the first positioning algorithm may be a vehicle dead reckoning algorithm, or the first positioning algorithm may be a combination of a wireless positioning algorithm and a vehicle dead reckoning algorithm.

Optionally, the mobile device may set a counter to count the driving state. When it is detected that the status of the mobile device is the driving state, a value of the counter is increased by 1, and when a non-driving state is detected, the value of the counter returns to zero. When the value of the counter is M, the mobile device determines that the quantity of times that the driving state consecutively occurs reaches M, and the mobile device positions the mobile device by using the first positioning algorithm.

103. When the mobile device detects that a quantity of times that a walking state consecutively occurs reaches N, position the mobile device by using a second positioning algorithm.

In this embodiment of the present invention, N is an integer greater than 1. Herein, M may be the same as or different from N. Optionally, the second positioning algorithm may be a pedestrian dead reckoning algorithm, or the second positioning algorithm may be a combination of the wireless positioning algorithm and a pedestrian dead reckoning algorithm. The first positioning algorithm is different from the second positioning algorithm.

Optionally, the mobile device may set a counter to count the walking state. When it is detected that the status of the mobile device is the walking state, a value of the counter is increased by 1, and when a non-walking state is detected, the value of the counter returns to zero. When the value of the counter is N, the mobile device determines that the quantity of times that the walking state consecutively occurs reaches N, and the mobile device positions the mobile device by using the second positioning algorithm.

Optionally, 102 and 103 may not be performed in sequence, and 103 may be performed after 102, or 102 may be performed after 103. For example, after the mobile device detects that the quantity of times that the driving state consecutively occurs reaches M and the mobile device is positioned by using the first positioning algorithm, whether the quantity of times that the walking state consecutively occurs reaches N may be detected when a currently-used positioning algorithm is the first positioning algorithm. If the quantity of times that the walking state consecutively occurs reaches N, the mobile device is positioned by using the second positioning algorithm. Alternatively, after the mobile device detects that the quantity of times that the walking state consecutively occurs reaches N and the mobile device is positioned by using the second positioning algorithm, whether the quantity of times that the driving state consecutively occurs reaches M may be detected when a currently-used positioning algorithm is the second positioning algorithm. If the quantity of times that the driving state consecutively occurs reaches M, the mobile device is positioned by using the first positioning algorithm.

In the method described in FIG. 1, the mobile device is positioned by using the first positioning algorithm only when the mobile device detects that the quantity of times that the driving state consecutively occurs reaches M; and the mobile device is positioned by using the second positioning algorithm only when the mobile device detects that the quantity of times that the walking state consecutively occurs reaches N. It can be learned that the status of the mobile device can be more accurately determined by implementing this embodiment of the present invention, so as to position the mobile device by using a positioning algorithm matching an actual status of the mobile device, thereby improving accuracy of a positioning result.

In an optional implementation, only when the currently-used positioning algorithm is a non-first positioning algorithm, the mobile device detects whether the quantity of times that the driving state consecutively occurs reaches M. When the mobile device detects that the quantity of times that the driving state consecutively occurs reaches M, the mobile device is positioned by using the first positioning algorithm.

In this implementation, it is unnecessary to constantly detect whether the quantity of times that the driving state of the mobile device consecutively occurs reaches M, so as to save a CPU resource.

In an optional implementation, only when the currently-used positioning algorithm is a non-second positioning algorithm, the mobile device detects whether the quantity of times that the walking state consecutively occurs reaches N. When the mobile device detects that the quantity of times that the walking state consecutively occurs reaches N, the mobile device is positioned by using the second positioning algorithm.

In this implementation, it is unnecessary to detect whether the quantity of times that the walking state of the mobile device consecutively occurs reaches N, so as to save a CPU resource.

In an optional implementation, when the currently-used positioning algorithm is a non-first positioning algorithm, the mobile device may directly detect whether the quantity of times that the driving state consecutively occurs reaches M. When detecting that the quantity of times that the driving state consecutively occurs reaches M, the mobile device is positioned by using the first positioning algorithm.

In an optional implementation, when the currently-used positioning algorithm is a non-second positioning algorithm, the mobile device may directly detect whether the quantity of times that the walking state consecutively occurs reaches N. When detecting that the quantity of times that the walking state consecutively occurs reaches N, the mobile device is positioned by using the second positioning algorithm.

For example, when a third positioning algorithm is currently used, the mobile device may directly detect whether the quantity of times that the driving state consecutively occurs reaches M and whether the quantity of times that the walking state consecutively occurs reaches N. When the mobile device detects that the quantity of times that the driving state consecutively occurs reaches M, the mobile device is positioned by using the first positioning algorithm; and when the mobile device detects that the quantity of times that the walking state consecutively occurs reaches N, the mobile device is positioned by using the second positioning algorithm. The third positioning algorithm may be the wireless positioning algorithm, or another positioning algorithm other than the first positioning algorithm and the second positioning algorithm.

In an optional implementation, a specific implementation of positioning the mobile device by using the first positioning algorithm when the mobile device detects that the quantity of times that the driving state consecutively occurs reaches M may be:

positioning the mobile device by using the first positioning algorithm when the mobile device detects that a quantity of times that a non-walking state of the mobile device consecutively occurs reaches X and a quantity of times that the driving state consecutively occurs in the X times of the non-walking state reaches M.

This is, in this implementation, the mobile device does not directly detect whether the quantity of times that the driving state consecutively occurs reaches M, but first detects whether the quantity of times that the non-walking state consecutively occurs reaches X; and when detecting that the quantity of times that the non-walking state consecutively occurs reaches X, further detect whether the quantity of times that the driving state consecutively occurs in the X times of the non-walking state reaches M. Herein, X is an integer that is not less than M. When the quantity of times that the driving state consecutively occurs in the X times of the non-walking state reaches M, the mobile device is positioned by using the first positioning algorithm.

In this implementation, optionally, the mobile device may set a first counter to count the non-walking state, and set a second counter to count the driving state. When it is detected that the status of the mobile device is the non-walking state, a value of the first counter is increased by 1; and when the walking state is detected, the value of the first counter returns to zero. When it is detected that the status of the mobile device is the driving state, a value of the second counter is increased by 1; and when the non-driving state is detected, the value of the second counter returns to zero. Whether the value of the second counter reaches M is detected if the value of the first counter reaches X, and if the value of the second counter reaches M, positioning is performed by using the first positioning algorithm.

In this implementation, if the quantity of times that the driving state consecutively occurs in the X times of the non-walking state reaches M, it proves that there is a high probability that the current actual state of the mobile device is the driving state. Therefore, in this case, a mobile terminal is positioned by using the first positioning algorithm, so as to improve accuracy of a positioning result.

In an optional implementation, the mobile device may further execute the following step:

positioning the mobile device by using the third positioning algorithm when the mobile device detects that the quantity of times that the non-walking state of the mobile device consecutively occurs reaches X and the quantity of times that the driving state consecutively occurs in the X times of the non-walking state does not reach M.

In this implementation, X is an integer that is not less than M. The third positioning algorithm may be the wireless positioning algorithm, or another positioning algorithm other than the first positioning algorithm and the second positioning algorithm.

In this implementation, if the quantity of times that the driving state consecutively occurs in the X times of the non-walking state does not reach M, it proves that there is a high probability that the current actual status of the mobile device is neither the walking state nor the driving state. For example, in this case, the actual status of the mobile device may be a shaking state, and positioning performed by using the first positioning algorithm or the second positioning algorithm in the shaking state has relatively low accuracy. It can be learned that by implementing this implementation, when it is detected that the quantity of times that the driving state consecutively occurs in the X times of the non-walking state does not reach M, a mobile terminal is positioned by using another positioning algorithm other than the first positioning algorithm or the second positioning algorithm, so as to improve accuracy of a positioning result.

For example, when the mobile device detects, by currently using a non-second positioning algorithm, that the quantity of times that the walking state consecutively occurs reaches N, the mobile device positions the mobile device by using the second positioning algorithm. In this case, when the mobile device positions the mobile device by using the second positioning algorithm, the mobile device may detect whether the quantity of times that the non-walking state consecutively occurs reaches X. If it is detected that the quantity of times that the non-walking state consecutively occurs reaches X, when the mobile device positions the mobile device by using the second positioning algorithm, the mobile device detects whether the quantity of times that the driving state consecutively occurs in the X times of the non-walking state reaches M. If it is detected that the quantity of times that the driving state consecutively occurs in the X times of the non-walking state reaches M, the mobile device is positioned by using the first positioning algorithm. If it is detected that the quantity of times that the driving state consecutively occurs in the X times of the non-walking state does not reach M, the mobile device is positioned by using the third positioning algorithm.

In an optional implementation, a specific implementation of positioning the mobile device by using the second positioning algorithm when the mobile device detects that the quantity of times that the walking state consecutively occurs reaches N may be:

positioning the mobile device by using the second positioning algorithm when the mobile device detects that a quantity of times that a non-driving state of the mobile device consecutively occurs reaches Y and a quantity of times that the walking state consecutively occurs in the Y times of the non-driving state reaches N.

This is, in this implementation, the mobile device does not directly detect whether the quantity of times that the walking state consecutively occurs reaches N, instead, the mobile device first detects whether the quantity of times that the non-driving state consecutively occurs reaches Y; and when detecting that the quantity of times that the non-driving state consecutively occurs reaches Y, further detect whether the quantity of times that the walking state consecutively occurs in the Y times of the non-driving state reaches N. Herein, Y is an integer that is not less than N. When the quantity of time that the walking state consecutively occurs in the Y times of the non-driving state reaches N, the mobile device is positioned by using the second positioning algorithm.

In this implementation, optionally, the mobile device may set a first counter to count the non-driving state, and set a second counter to count the walking state. When it is detected that the status of the mobile device is the non-driving state, a value of the first counter is increased by 1; and when the driving state is detected, the value of the first counter returns to zero. When it is detected that the status of the mobile device is the walking state, a value of the second counter is increased by 1; and when the non-walking state is detected, the value of the second counter returns to zero. Whether the value of the second counter reaches N is detected if the value of the first counter reaches Y, and if the value of the second counter reaches N, positioning is performed by using the second positioning algorithm.

In this implementation, if the quantity of times that the walking state consecutively occurs in the Y times of the non-driving state reaches N, it proves that there is a high probability that the current actual state of the mobile device is the walking state. Therefore, in this case, a mobile terminal is positioned by using the second positioning algorithm, so as to improve accuracy of a positioning result.

In an optional implementation, the mobile device may further execute the following step:

positioning the mobile device by using the third positioning algorithm when it is detected that a quantity of times that a non-driving state of the mobile device consecutively occurs reaches Y and a quantity of times that a walking state consecutively occurs in the Y times of the non-driving state does not reach N.

In this implementation, Y is an integer that is not less than N. The third positioning algorithm may be the wireless positioning algorithm, or another positioning algorithm other than the first positioning algorithm and the second positioning algorithm.

In this implementation, if the quantity of times that the walking state consecutively occurs in the Y times of the non-driving state does not reach N, it proves that there is a high probability that the current actual status of the mobile device is neither the walking state nor the driving state. Therefore, in this case, the mobile terminal is positioned by using another positioning algorithm other than the first positioning algorithm and the second positioning algorithm, so as to improve accuracy of a positioning result.

For example, when the mobile device detects, by currently using a non-first positioning algorithm, that the quantity of times that the driving state consecutively occurs reaches M, the mobile device positions the mobile device by using the first positioning algorithm. In this case, when the mobile device positions the mobile device by using the first positioning algorithm, the mobile device may detect whether the quantity of times that the non-driving state consecutively occurs reaches Y. If it is detected that the quantity of times that the non-driving state consecutively occurs reaches Y, the mobile device detects whether the quantity of times that the walking state consecutively occurs in the Y times of the non-driving state reaches N; and if it is detected that the quantity of times that the walking state consecutively occurs in the Y times of the non-driving state reaches N, positions the mobile device by using the second positioning algorithm; or if it is detected that the quantity of times that the walking state consecutively occurs in the Y times of the non-driving state does not reach N, positions the mobile device by using the third positioning algorithm.

In an optional implementation, at least one driving state in the M times that the driving state consecutively occurs is obtained by replacing the static state.

In this implementation, optionally, when it is detected that the current status of the mobile device is the static state, if a latest status detected before the static state is the driving state in the driving state and the walking state, the static state is replaced by the driving state. The first positioning algorithm is also applicable to the static state, that is, the mobile device in the static state can be accurately positioned by using the first positioning algorithm. Therefore, the static state may be replaced by the latest driving state detected before the static state.

In an optional implementation, each state in the M times that the driving state consecutively occurs is an actually detected state, that is, each state is not obtained by replacing another state.

In an optional implementation, at least one walking state in the N times that the walking state consecutively occurs is obtained by replacing the static state.

In this implementation, optionally, when it is detected that the current status of the mobile device is the static state, if a latest status detected before the static state is the walking state in the driving state and the walking state, the static state is replaced by the walking state. The second positioning algorithm is also applicable to the static state, that is, the mobile device in the static state can also be accurately positioned by using the second positioning algorithm. Therefore, the static state may be replaced by the latest walking state detected before the static state.

In an optional implementation, each state in the N times that the walking state consecutively occurs is a state actually detected by the mobile device, that is, each state is not obtained by replacing another state.

Figure 2:
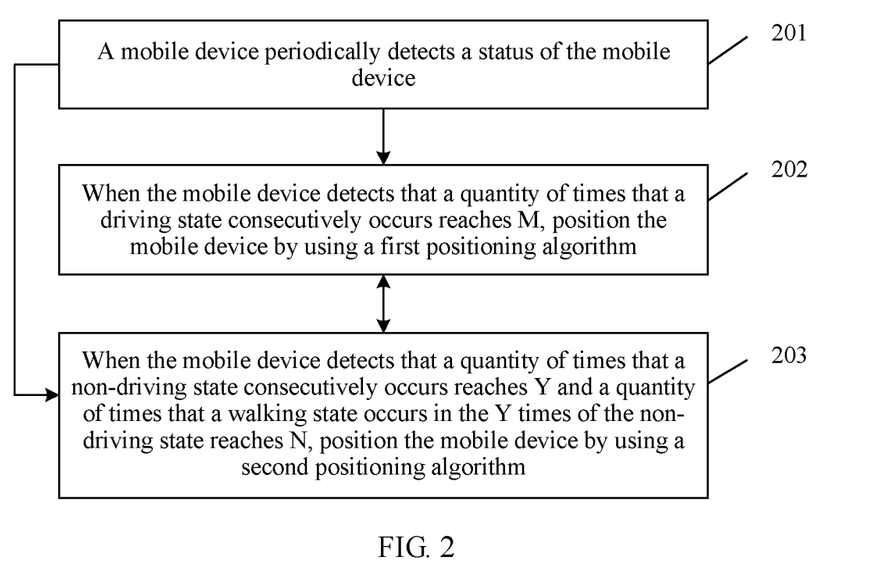
FIG. 2 is a schematic flowchart of another positioning method according to an embodiment of the present invention.

FIG. 2 is a schematic flowchart of another positioning method according to an embodiment of the present invention. As shown in FIG. 2, the positioning method may include 201 to 203. For a specific implementation of this embodiment, refer to the second aspect and the possible design of the second aspect. Details are not described herein again. Optionally, in this embodiment, 202 and 203 may not be performed in sequence. 203 may be executed after 202, or 202 may be executed after 203. For example, after a mobile device detects that a quantity of times that a driving state consecutively occurs reaches M and the mobile device is positioned by using a first positioning algorithm, whether a quantity of times that a non-driving state of the mobile device consecutively occurs reaches Y and whether a quantity of times that a walking state consecutively occurs in the Y times of the non-driving state reaches N may be detected when a currently-used positioning algorithm is the first positioning algorithm. If the quantity of times that the non-driving state of the mobile device consecutively occurs reaches Y and the quantity of times that the walking state occurs in the Y times of the non-driving state reaches N, the mobile device is positioned by using a second positioning algorithm. Alternatively, after a mobile device detects that a quantity of times that a non-driving state of the mobile device consecutively occurs reaches Y and a quantity of times that a walking state consecutively occurs in the Y times of the non-driving state reaches N, and the mobile device is positioned by using a second positioning algorithm, whether a quantity of times that a driving state consecutively occurs reaches M may be detected when a currently-used positioning algorithm is the second positioning algorithm. If the quantity of times that the driving state consecutively occurs reaches M, the mobile device is positioned by using a first positioning algorithm.

Figure 3:
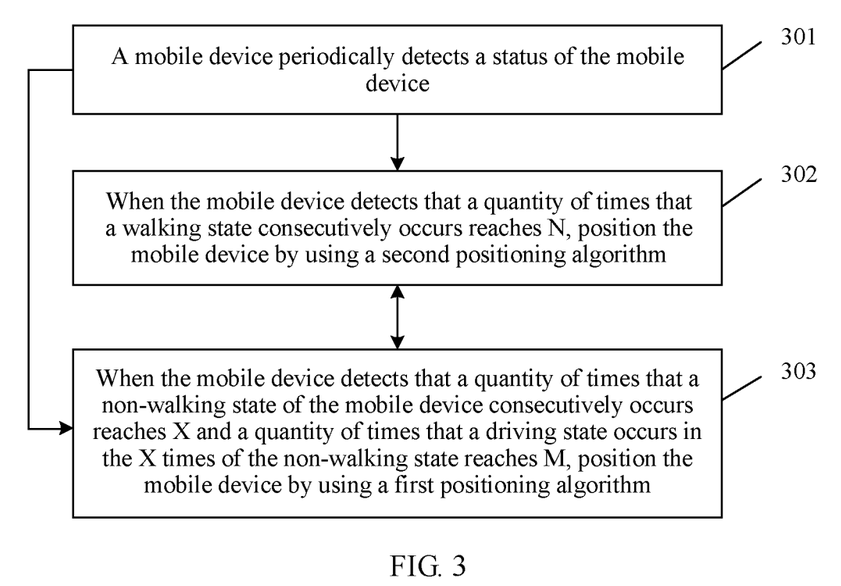
FIG. 3 is a schematic flowchart of still another positioning method according to an embodiment of the present invention.

FIG. 3 is a schematic flowchart of another positioning method according to an embodiment of the present invention. As shown in FIG. 3, the positioning method may include 301 to 303. For a specific implementation of this embodiment, refer to the third aspect and the possible design of the third aspect. Details are not described herein again. Optionally, in this embodiment, 302 and 303 may not be performed in sequence. For example, after a mobile device detects that a quantity of times that a walking state consecutively occurs reaches N and the mobile device is positioned by using a second positioning algorithm, whether a quantity of times that a non-walking state of the mobile device consecutively occurs reaches X and whether a quantity of times that a driving state occurs in the X times of the non-walking state reaches M may be detected when a currently-used positioning algorithm is the second positioning algorithm. If the quantity of times that the non-walking state of the mobile device consecutively occurs reaches X and the quantity of times that the driving state occurs in the X times of the non-walking state reaches M, the mobile device is positioned by using a first positioning algorithm. Alternatively, after a mobile device detects that a quantity of times that a non-walking state of the mobile device consecutively occurs reaches X and a quantity of times that a driving state occurs in the X times of the non-walking state reaches M, and the mobile device is positioned by using a first positioning algorithm, whether a quantity of times that a walking state consecutively occurs reaches N may be detected when a currently-used positioning algorithm is the first positioning algorithm. If the quantity of times that the walking state consecutively occurs reaches N, the mobile device is positioned by using a second positioning algorithm.

In an embodiment of the present invention, function unit division may be performed on the mobile device according to the foregoing method example. For example, each function unit may be obtained by means of division according to a corresponding function, or two or more functions may be integrated into one unit. The integrated unit may be implemented in a form of hardware, or may be implemented in a form of a software functional unit. It should be noted that the unit division in this embodiment of the present invention is an example, and is merely logical function division. There may be another division manner in an actual implementation.

Figure 4:
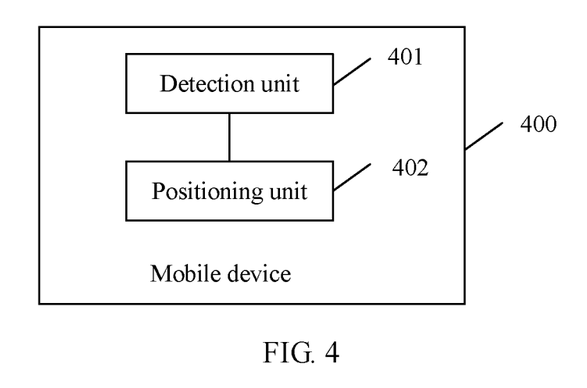
FIG. 4 is a schematic structural diagram of a mobile device according to an embodiment of the present invention.

When an integrated unit is used, FIG. 4 shows a possible schematic structural diagram of the mobile device described in the foregoing embodiments. A mobile device 400 includes a detection unit 401 and a positioning unit 402. The detection unit 401 is configured to support the mobile device to perform the process 101 in FIG. 1, the process 201 in FIG. 2, or the process 301 in FIG. 3, and/or another process of technologies described in this application. The positioning unit 402 is configured to support the mobile device to perform the processes 102 and 103 in FIG. 1, the processes 202 and 203 in FIG. 2, or the processes 302 and 303 in FIG. 3, and/or another process of the technologies described in this application.

In a possible design, the detection unit 401 may be replaced by a detector, and the positioning unit 402 may be replaced by a locator.

Figure 5:
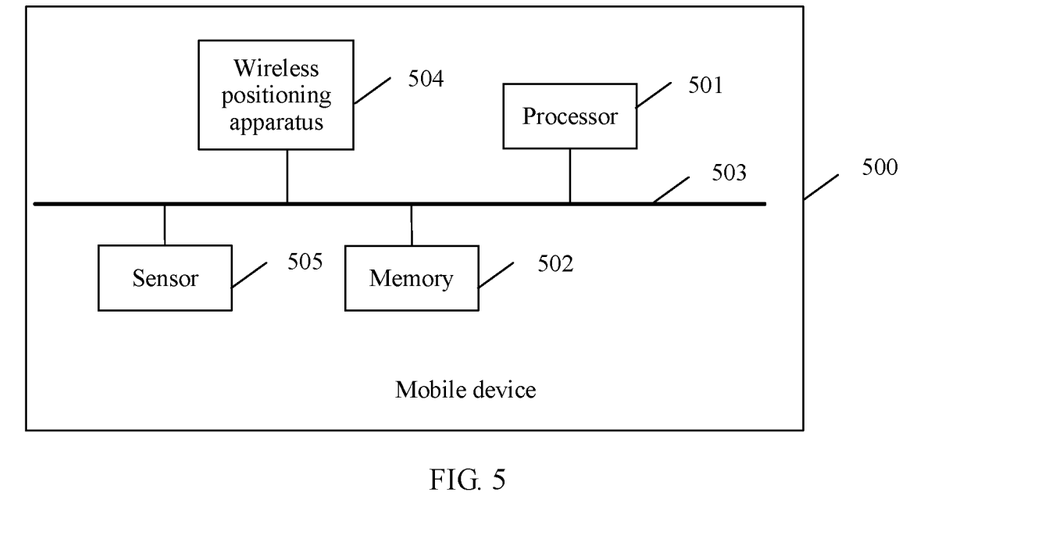
FIG. 5 is a schematic structural diagram of another mobile device according to an embodiment of the present invention.

Referring to FIG. 5, FIG. 5 is another possible schematic structural diagram of a mobile device disclosed in an embodiment of the present invention. As shown in FIG. 5, a mobile device 500 includes one or more processors 501, a memory 502, a bus system 503, and one or more programs. Optionally, the mobile device 500 may further include a wireless positioning apparatus 504 and a sensor 505. The processor 501 and the memory 502 are connected by using the bus system 503. The processor 501 may be a central processing unit (Central Processing Unit, CPU), a general purpose processor, a coprocessor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. Alternatively, the processor 501 may be a combination of processors implementing a computing function, for example, a combination of one or more microprocessors, or a combination of the DSP and a microprocessor. The one or more programs are stored in the memory 502, and the one or more programs include an instruction. When executing the instruction, the mobile device performs the processes 101, 102, and 103 in FIG. 1, the processes 201, 202, and 203 in FIG. 2, or the processes 301, 302, and 303 in FIG. 3, and/or another process of technologies described in this application.

The sensor 505 and the wireless positioning apparatus 504 may be located outside the processor 501, or may be located inside the processor 501. This is not limited in this embodiment of the present invention. When the sensor 505 and the wireless positioning apparatus 504 are located outside the processor 501, the sensor 505 and the wireless positioning apparatus 504 are connected to the processor 501 by using a bus system 503.

The sensor 505 may include but is not limited to an accelerator, a gyroscope, a geomagnetic sensor, and the like. When the sensor 505 is located outside the processor 501, the sensor 505 may transmit detected data to the processor 501 by using the bus system 503, so that the processor 501 positions the mobile device by identifying a status of the mobile device according to the data detected by the sensor 505, or by using a positioning algorithm for pedestrian dead reckoning or a positioning algorithm for vehicle dead reckoning. The wireless positioning apparatus 504 may include but is not limited to a Wi-Fi module, a Bluetooth module, and the like, and is configured to receive a wireless positioning signal. When being located outside the processor 501, the wireless positioning apparatus 504 sends related information of a received wireless positioning signal to the processor 501 by using the bus system 503, so that the processor 501 can perform positioning according to the information sent by the wireless positioning apparatus 504.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A positioning method, applied to a mobile device comprising a sensor and a positioning apparatus, wherein the method comprises:
   periodically detecting, by the sensor, a status of the mobile device, wherein the status of the mobile device comprises a driving state and a walking state;
   identifying, by the positioning apparatus, a position of the mobile device using a first positioning algorithm when detecting that a quantity of times that the driving state consecutively occurs reaches M, wherein the M is an integer greater than one;
   identifying, by the positioning apparatus, the position of the mobile device using a second positioning algorithm when detecting that a quantity of times that the walking state consecutively occurs reaches N, wherein the N is an integer greater than one; and
   identifying, by the positioning apparatus, the position of the mobile device using a third positioning algorithm when detecting that a quantity of times that a non-driving state of the mobile device consecutively occurs reaches Y and a quantity of times that the walking state consecutively occurs in the Y times of the non-driving state does not reach the N, wherein the Y is an integer not less than the N.

2. The positioning method of claim 1, wherein identifying the position of the mobile device using the second positioning algorithm comprises identifying the position of the mobile device using the second positioning algorithm when detecting that a quantity of times that a non-driving state of the mobile device consecutively occurs reaches Y and a quantity of times that the walking state consecutively occurs in the Y times of the non-driving state reaches the N.

3. The positioning method of claim 1, wherein identifying the position of the mobile device using the first positioning algorithm comprises identifying a position of the mobile device using the first positioning algorithm when detecting that a quantity of times that a non-walking state of the mobile device consecutively occurs reaches X and a quantity of times that the driving state consecutively occurs in the X times of the non-walking state reaches the M, and wherein the X is an integer not less than the M.

4. The positioning method of claim 1, further comprising identifying the position of the mobile device using the third positioning algorithm when detecting that a quantity of times that a non-walking state of the mobile device consecutively occurs reaches X and a quantity of times that the driving state consecutively occurs in the X times of the non-walking state does not reach the M, wherein the X is an integer not less than M.

5. The positioning method of claim 1, wherein the status of the mobile device further comprises a static state, and wherein either:
at least one driving state in the M times that the driving state consecutively occurs is obtained by replacing the static state; or
at least one walking state in the N times that the walking state consecutively occurs is obtained by replacing the static state.

6. The positioning method of claim 1, wherein the first positioning algorithm is a vehicle dead reckoning algorithm, and wherein the second positioning algorithm is a pedestrian dead reckoning algorithm.

7. The positioning method of claim 1, wherein the third positioning algorithm is an algorithm for non-vehicle dead reckoning and non-pedestrian dead reckoning.

8. The positioning method of claim 1, wherein the third positioning algorithm is a wireless positioning algorithm.

9. A mobile device, comprising:
a sensor;
a positioning apparatus;
a non-transitory computer-readable storage medium configured to store program instructions; and
at least one processor coupled to the sensor, the positioning apparatus, and the non-transitory computer-readable storage medium, the program instructions causing the at least one processor to be configured to:
periodically detect a status of the mobile device, wherein the status of the mobile device comprises a driving state and a walking state;
identify a position of the mobile device using a first positioning algorithm when detecting that a quantity of times that the driving state consecutively occurs reaches M, wherein the M is an integer greater than one;
identify the position of the mobile device using a second positioning algorithm when detecting that a quantity of times that the walking state consecutively occurs reaches N, wherein the N is an integer greater than one; and
identify the position of the mobile device using a third positioning algorithm when detecting that a quantity of times that a non-driving state of the mobile device consecutively occurs reaches Y and a quantity of times that the walking state consecutively occurs in the Y times of the non-driving state does not reach the N, wherein the Y is an integer not less than the N.

10. The mobile device of claim 9, wherein in a manner of identifying the position of the mobile device using the second positioning algorithm, the program instructions further cause the at least one processor to be configured to identify the position of the mobile device using the second positioning algorithm when detecting that a quantity of times that a non-driving state of the mobile device consecutively occurs reaches Y and a quantity of times that the walking state consecutively occurs in the Y times of the non-driving state reaches the N.

11. The mobile device of claim 9, wherein in a manner of identifying the position of the mobile device using the first positioning algorithm, the program instructions further cause the at least one processor to be configured to identify the position of the mobile device using the first positioning algorithm when detecting that a quantity of times that a non-walking state of the mobile device consecutively occurs reaches X and a quantity of times that the driving state consecutively occurs in the X times of the non-walking state reaches the M, and wherein the X is an integer not less than M.

12. The mobile device of claim 9, wherein the program instructions further cause the at least one processor to be configured to identify the position of the mobile device using the third positioning algorithm when detecting that a quantity of times that a non-walking state of the mobile device consecutively occurs reaches X and a quantity of times that the driving state consecutively occurs in the X times of the non-walking state does not reach the M, and wherein the X is an integer not less than M.

13. The mobile device of claim 9, wherein the status of the mobile device further comprises a static state, and wherein either:
at least one driving state in the M times that the driving state consecutively occurs is obtained by replacing the static state; or
at least one walking state in the N times that the walking state consecutively occurs is obtained by replacing the static state.

14. The mobile device of claim 9, wherein the first positioning algorithm is a vehicle dead reckoning algorithm, and wherein the second positioning algorithm is a pedestrian dead reckoning algorithm.

15. The mobile device of claim 9, wherein the third positioning algorithm is an algorithm for non-vehicle dead reckoning and non-pedestrian dead reckoning.

16. The mobile device of claim 9, wherein the third positioning algorithm is a wireless positioning algorithm.

17. A non-transitory computer readable storage medium storing one or more programs, the one or more programs comprising an instruction, and when executed by a mobile device comprising a sensor and a positioning apparatus, the instruction causing the mobile device to:
periodically detect, by the sensor, a status of the mobile device, wherein the status of the mobile device comprises a driving state and a walking state;
identify, by the positioning apparatus, a position of the mobile device using a first positioning algorithm when detecting that a quantity of times that the driving state consecutively occurs reaches M, wherein the M is an integer greater than one;
identify, by the positioning apparatus, a position of the mobile device using a second positioning algorithm when detecting that a quantity of times that the walking state consecutively occurs reaches N, wherein the N is an integer greater than one; and
identify, by the positioning apparatus, the position of the mobile device using a third positioning algorithm when detecting that a quantity of times that a non-driving state of the mobile device consecutively occurs reaches Y and a quantity of times that the walking state consecutively occurs in the Y times of the non-driving state does not reach the N, wherein the Y is an integer not less than the N.

18. The non-transitory computer readable medium of claim 17, wherein in a manner of identifying the position of the mobile device using the second positioning algorithm, the instruction further causes the mobile device to identify the position of the mobile device using the second positioning algorithm when detecting that a quantity of times that a non-driving state of the mobile device consecutively occurs reaches Y and a quantity of times that the walking state consecutively occurs in the Y times of the non-driving state reaches the N.

19. The non-transitory computer readable medium of claim 17, wherein in a manner of identifying the position of the mobile device using the first positioning algorithm, the instruction further causes the mobile device to identify the position of the mobile device using the first positioning algorithm when detecting that a quantity of times that a non-walking state of the mobile device consecutively occurs reaches X and a quantity of times that the driving state consecutively occurs in the X times of the non-walking state reaches the M, and wherein the X is an integer not less than the M.

20. The non-transitory computer readable medium of claim 17, wherein the third positioning algorithm is a wireless positioning algorithm.

\* \* \* \* \*